US006564149B2

(12) United States Patent
Lai

(10) Patent No.: US 6,564,149 B2
(45) Date of Patent: May 13, 2003

(54) METHOD FOR DETERMINING CONFLICTING PATHS BETWEEN MOBILE AIRBORNE VEHICLES AND ASSOCIATED SYSTEM AND COMPUTER SOFTWARE PROGRAM PRODUCT

(75) Inventor: Chih Lai, Woodbury, MN (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 09/901,415

(22) Filed: Jul. 9, 2001

(65) Prior Publication Data
US 2002/0032528 A1 Mar. 14, 2002

Related U.S. Application Data
(60) Provisional application No. 60/217,231, filed on Jul. 10, 2000.

(51) Int. Cl.$^7$ .............................. G06G 7/78; G06F 17/10
(52) U.S. Cl. ..................... 701/301; 701/120; 701/122; 701/300; 340/945; 340/961; 340/963; 342/29; 342/32
(58) Field of Search ................................. 701/301, 300, 701/14, 15, 16, 122, 121, 120; 340/945, 961, 963; 342/30, 455, 46, 29, 32, 36, 37

(56) References Cited
U.S. PATENT DOCUMENTS

| | | | |
|---|---|---|---|
| 3,849,782 A | * 11/1974 | Bond | 342/30 |
| 4,063,073 A | 12/1977 | Strayer | |
| 4,107,674 A | * 8/1978 | Funatsu et al. | 342/32 |
| 4,196,434 A | * 4/1980 | Funatsu et al. | 342/32 |
| 4,317,119 A | * 2/1982 | Alvarez | 342/455 |
| 4,639,730 A | 1/1987 | Paterson et al. | |
| 4,646,244 A | 2/1987 | Bateman et al. | |
| 4,839,658 A | 6/1989 | Kathol et al. | |
| 4,910,526 A | * 3/1990 | Donnangelo et al. | 342/32 |
| 4,914,733 A | 4/1990 | Gralnick | |
| 4,980,683 A | 12/1990 | O'Sullivan et al. | |
| 5,025,382 A | 6/1991 | Artz | |
| 5,157,615 A | 10/1992 | Brodegard et al. | |
| 5,185,606 A | 2/1993 | Verbaarschot et al. | |
| 5,442,556 A | 8/1995 | Boyes et al. | |
| 5,636,123 A | * 6/1997 | Rich et al. | 342/29 |
| 5,872,526 A | 2/1999 | Tognazzini | |
| 5,884,223 A | 3/1999 | Tognazzini | |
| 5,892,462 A | 4/1999 | Tran | |
| 6,021,374 A | 2/2000 | Wood | |
| 6,133,867 A | * 10/2000 | Eberwine et al. | 342/125 |
| 6,314,366 B1 | * 11/2001 | Farmakis et al. | 340/961 |

FOREIGN PATENT DOCUMENTS
EP 0 405 430 A2 1/1991

* cited by examiner

Primary Examiner—Jacques H. Louis-Jacques
(74) Attorney, Agent, or Firm—Alston & Bird LLP

(57) ABSTRACT

A method of determining conflicting flight paths between a first and a second airborne vehicle is provided, wherein each vehicle comprises an aircraft-to-aircraft navigational communication system having a navigational device. First, a position and a velocity vector are determined for each of the airborne vehicles. A cylindrical volume is then defined about the first airborne vehicle. A separation distance is then determined between the vehicles at a selected time and using a great circle earth model. An accuracy factor is thereafter determined for the position of each vehicle. The separation distance is then modified by the accuracy factor. A determination is then made as to whether the modified separation distance is within the cylindrical volume about the first airborne vehicle during a time range to thereby determine whether conflicting flight paths exist between the vehicles. An associated system and computer software program product are also provided.

58 Claims, 4 Drawing Sheets

METHOD FOR DETERMINING CONFLICTING PATHS BETWEEN MOBILE AIRBORNE VEHICLES AND ASSOCIATED SYSTEM AND COMPUTER SOFTWARE PROGRAM PRODUCT

CROSS-REFERENCE TO RELATED APPLICATIONS

This application claims the benefit of U.S. Provisional Patent Application No. 60/217,231, filed Jul. 10, 2000.

FIELD OF THE INVENTION

The present invention relates to collision avoidance systems and, more particularly, to a method, system, and computer software program product for determining conflicting paths between mobile airborne vehicles.

BACKGROUND OF THE INVENTION

Air traffic is ever increasing as the number of aircraft in service continues to grow. Travel demands and movement of air cargo also contribute to the number of aircraft taking to the skies. Accordingly, the avoidance of mid-air collisions between aircraft has become a significant concern as keeping track of heavy air traffic becomes an increasingly difficult process. The speed and size of modern aircraft are factors contributing to the difficulty of the tracking process, especially when multiple aircraft are involved. Approximations may no longer be acceptable as air space becomes limited and as time and separation distances decrease. Also, proposals to replace the present air traffic control system with a "free flight" system will require reliable collision warnings based on aircraft-to-aircraft communications.

In some instances, the devices used to determine the aircraft position relative to the earth may be subject to inaccuracies. Global Navigation Satellite Systems ("GNSS") such as, for example, Global Positioning System ("GPS") devices, are well known in the art and are commonly used for the determination of the geodetic longitude and latitude coordinates of mobile vehicles employing such a device. For simplicity, a GPS device will be discussed herein as an example of a GNSS, wherein the term "GNSS" and "GPS" may be used interchangeably. However, it will be understood by one skilled in the art that the present invention is not restricted to a GPS device and may be applicable to other GNSS-type devices according to the spirit and scope of the present invention.

With a GPS device, information signals transmitted from a plurality of satellites to a GPS receiver are analyzed using known trilateration techniques in order to determine the geodetic coordinates of the receiver, wherein the geodetic coordinates are typically provided in latitude and longitude. The geodetic coordinates (latitude and longitude), however, may vary in accuracy due to, for example, atmospheric conditions, selective satellite availability, and the relevant positions of the satellites with respect to the line-of-sight view of the satellites. Often associated with this variance in GPS accuracy is an integrity determination, which produces a warning if it is determined that the GPS accuracy is insufficient to be relied upon for navigational purposes. Accordingly, where a GPS integrity system is provided, a maximum horizontal position error, otherwise referred to as a "horizontal protection level" ("HPL") may be determined and compared to an allowable radial error, otherwise referred to as a "horizontal alarm limit" ("HAL"). If the HPL is found to exceed the HAL, then a warning is issued that the geodetic coordinates should not be relied upon for accuracy.

In other instances, the GPS device may be interfaced with other navigational equipment, wherein the GPS device may also be relied upon to provide location coordinates as well as position accuracy and/or integrity information. For example, the GPS device may be interfaced with a Mode S transponder, via a processing unit, with the transponder configured to receive either position integrity or position accuracy information from the GPS device, as is known in the art. The position accuracy or integrity information is converted into a corresponding code in a data stream which is then transmitted by the transponder. The data thus transmitted by the transponder indicates the position of the vehicle carrying the GPS device, as well as the level of integrity and/or accuracy of that position information.

Other factors may also contribute to inaccuracies in an aircraft collision avoidance system. For example, horizontal separation distances are often calculated based upon a flat earth model. Such a flat earth model may generate only a small amount of error for short ranges near the equator. However, since the earth is shaped more as a spheroid, the magnitude of error increases as the latitude shifts away from the equator. Thus, at or near the poles, the flat earth model will be subject to inaccuracies and generally cannot be used to calculate horizontal separation distances or ranges thereof.

Thus, there exists a need for a technology capable of determining conflicting flight paths between aircraft or other airborne vehicles that is able to account for sources of inaccuracies in determining horizontal separation distances, such as in navigational devices used by the airborne vehicles and in the modeling of the earth, so as to obtain a collision avoidance system that is effective regardless of geodetic latitude and longitude and that is configured to facilitate navigational efficiency and user-friendliness.

SUMMARY OF THE INVENTION

The above and other needs are met by the present invention which, in one embodiment, provides a method of determining conflicting flight paths between a first airborne vehicle and a second airborne vehicle. First, a position and a velocity vector are determined for each of the first airborne vehicle and the second airborne vehicle. A cylindrical volume is then defined about the first airborne vehicle such that the first airborne vehicle is centrally disposed therein. A separation distance is then determined between the first airborne vehicle and the second airborne vehicle, at least partially from the position and the velocity vector of each vehicle, at a selected time and using a great circle earth model. An accuracy factor is thereafter determined for the position of each vehicle. The determined separation distance is then modified by the accuracy factor. A determination is then made as to whether the modified separation distance is within the cylindrical volume about the first airborne vehicle during a time range so as to determine whether conflicting flight paths exist between the vehicles.

Another advantageous aspect of the present invention comprises a system for determining conflicting paths between a first airborne vehicle and a second airborne vehicle. The system comprises a computer device housed by the first airborne vehicle. The computer device further comprises a processing portion for determining a position and a velocity vector for each of the first airborne vehicle and second airborne vehicle. Another processing portion defines a cylindrical volume about the first airborne vehicle, wherein the first airborne vehicle is centrally disposed therein. A further processing portion determines a separation distance between the first airborne vehicle and the second airborne vehicle at a selected time and using a great circle earth model. Another processing portion determines an accuracy factor for the position of each vehicle. Still another processing portion modifies the determined separation distance by the accuracy factor. Still a further processing portion then determines whether the modified separation distance is within the cylindrical volume about the first airborne vehicle during a time range so as to determine whether conflicting flight paths exist between the vehicles.

Still another advantageous aspect of the present invention comprises a computer software program product capable of being executed by a computer device so as to determine conflicting flight paths between a first airborne vehicle and a second airborne vehicle. The computer software program product comprises an executable portion capable of determining a position and a velocity vector for each of the first and the second airborne vehicles. Another executable portion is capable of defining a cylindrical volume about the first airborne vehicle such that the first airborne vehicle is centrally disposed therein. Still another executable portion is capable of determining a separation distance between the first vehicle and the second vehicle at a selected time and using a great circle earth model. Yet another executable portion is capable determining an accuracy factor for the position of each vehicle. The separation distance is then modified by the accuracy factor with another executable portion. A further executable portion is capable of determining whether the modified separation distance is within the cylindrical volume about the first airborne vehicle during a time range so as to determine whether conflicting flight paths exist between the vehicles.

Thus, embodiments of the present invention provide a method, system, and computer software program product for determining conflicting flight paths between aircraft or other airborne vehicles. Embodiments of the present invention are further capable of accounting for sources of inaccuracies, such as those present in navigational devices used by the airborne vehicles and in the modeling of the earth, so as to provide a collision avoidance system that is effective regardless of geodetic latitude and longitude and that is configured to account for inaccuracies in a transparent manner so as to facilitate user-friendliness of the collision avoidance system. Embodiments of the present invention therefore provide distinct advantages over other collision avoidance systems.

BRIEF DESCRIPTION OF THE DRAWINGS

Some of the advantages of the present invention having been stated, others will appear as the description proceeds, when considered in conjunction with the accompanying drawings, which are not necessarily drawn to scale, in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
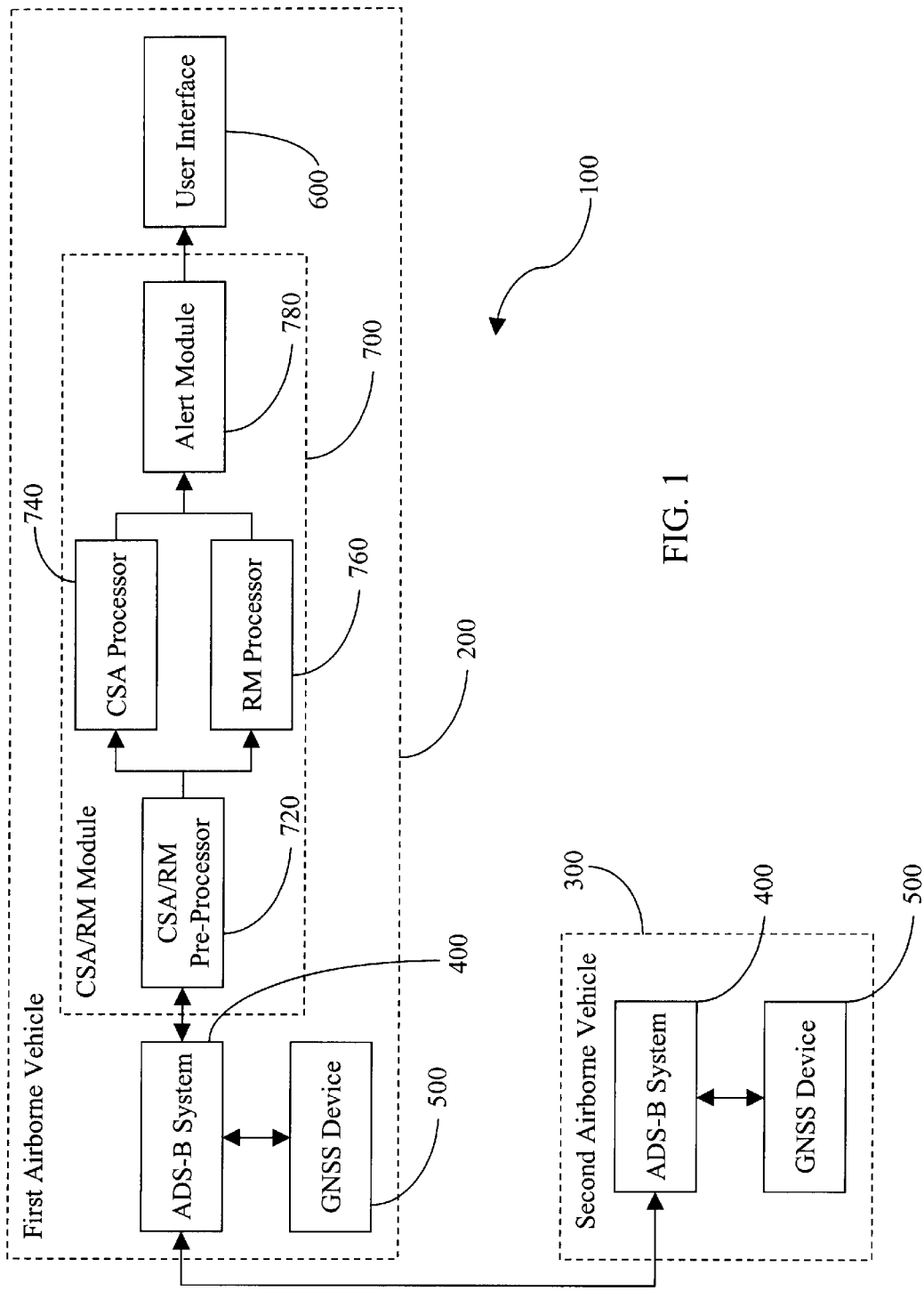
FIG. 1 is a schematic representation of a system architecture incorporating a Conflict Situation Awareness and Range Monitoring system (CSA/RM) according to one embodiment of the present invention.

FIG. 1 schematically illustrates a system architecture representing a system for determining conflicting paths between mobile airborne vehicles according to one embodiment of the present invention, the system architecture being indicated generally by the numeral 100. The system architecture 100 contemplates the analysis of conflicting flight paths between a first airborne vehicle ("monitoring aircraft") 200 and a second airborne vehicle ("target aircraft") 300, wherein it will be understood by one skilled in the art that the discussion herein is limited to a single target aircraft 300 for the sake of brevity, but that embodiments of the present invention may be applicable to a plurality of target aircraft 300. Generally, both the monitoring aircraft 200 and the target aircraft 300 comprise a system 400 for determining and broadcasting information related to the status, such as the position and the integrity of the determination of that position, of the particular aircraft. Such a system 400 may comprise, for example, an Automatic Dependent Surveillance-Broadcast ("ADS-B") system 400 as known to one skilled in the art. In some instances, the ADS-B system 400 may also implement a device for determining navigation-related information for the respective aircraft such as, for example, a Global Navigation Satellite System ("GNSS") device 500, wherein such a GNSS device 500 may comprise a Global Positioning System ("GPS") device. The information determined through the ADS-B system 400 is typically indicated on or by a user interface 600 such as, for example, a Cockpit Display of Traffic Information ("CDTI"). These described components of the system architecture 100 cooperate with a Conflict Situation Awareness and Range Monitoring ("CSA/RM") module 700 to provide a system for determining conflicting paths between mobile airborne vehicles according to one embodiment of the present invention. Note that, though the CSA/RM module 700 is indicated as a component of the first airborne vehicle 200, the CSA/RM module 700 may be incorporated within any aircraft employing an ADS-B system 400, or equivalent, or may be implemented as a stand-alone system capable of functioning as described herein and communicating with any aircraft employing an ADS-B system 400, or equivalent, within the spirit and scope of the present invention.

One particularly advantageous aspect of the present invention comprises the methodology underlying the conflict detection function provided by the CSA/RM module 700. Generally, the CSA/RM module 700 is configured to be capable of exchanging data with the ADS-B system 400, wherein the ADS-B system 400 may also require appropriate modifications to incorporate the CSA/RM module 700 to extend the capabilities of the combination thereof. As further shown in FIG. 1, the CSA/RM module 700 also comprises a CSA/RM pre-processor 720, a CSA processor 740, an RM processor 760, and an alert module 780.

First, as a matter of background and as previously discussed, an ADS-B system 400 having a GNSS device is often relied upon to provide location coordinates as well as position accuracy and/or integrity information. For example, a GPS device may be interfaced with a Mode S transponder, via a processing unit, in the ADS-B system 400, wherein the transponder is configured to receive either position integrity or position accuracy information from the GPS device, as is known in the art. Such position accuracy or integrity information is then converted into a corresponding code in a data stream and transmitted by the transponder. This transmitted data may be received by an ADS-B configured receiver so as to indicate to that receiver the navigational details of the transmitting aircraft. The data thus transmitted by the transponder indicates, for example, the position of the aircraft carrying the GPS device, as well as the level of integrity and/or accuracy of that position information.

Accordingly, the ADS-B system 400 may receive information from or about target aircraft through different data links, and possibly in different formats, wherein the quality of data through these data-links may vary due to, for example, reception quality. In such instances, a distinction may be implemented between a normal ADS-B report and a degraded ADS-B report, wherein a normal ADS-B report is more advantageous in terms of the quality of the data. An ADS-B report is classified as a degraded report if it, for example, has a Navigation Uncertainty Category for Position ("$NUC_P$") value less than 4; has no position, velocity, or $NUC_P$ information; has invalid position, velocity, or $NUC_P$ information; is extrapolated from a previous ADS-B report; or is a deleted or coasting ADS-B report. Note that it will be understood that the terminology used with respect to the description and operation of an ADS-B system, along with the utilization of an ADS-B system for determining valid and useful reports will be appreciated by one skilled in the art and will not be explained herein in further detail.

Accordingly, the CSA/RM pre-processor 720 processes the appropriate navigation data from the ADS-B system 400 of both the monitoring aircraft 200 and the target aircraft 300 so as to, for example, correlate both the target aircraft 300 and the monitoring aircraft 200 positions and velocity vectors to a common time reference. The time reference correlation ensures that the recorded positions of the respective aircraft accurately correspond to the reported real-time positions thereof, and thereby lowers the likelihood of false conflict alerts and the omission of alerts for real conflicts. The time reference correlation is necessitated by disparities that may be due to, for example, target aircraft information received from different data links having different times of applicability ("TOA"). Such instances may occur where, for example, a certain Mode-S transponder may not transmit a TOA at the beginning of a second. Further, due to the unpredictability of RF reception used by some ADS-B systems, target aircraft 300 may be stored and maintained in a target aircraft file for the purposes of the analysis, wherein the information on the various target aircraft may have different time references based on the time of reception of the information. In addition, a temporal difference may exist between the TOA of a target aircraft 300 and the time at which the target aircraft data is processed by the CSA/RM module 700.

Where the system architecture 100 contemplates the examination of multiple target aircraft 300, system functionality for determining a hierarchy or other order of the target aircraft 300 of interest may also be implemented such that the target aircraft 300 of highest importance or criticality may be given processing priority. Therefore, in order to ensure a timely reporting of potential conflicts, the CSA/RM pre-processor 720 may further include functions to, for example, sort multiple target aircraft 300 according to a specified criteria before forwarding the target aircraft data to the CSA processor 740. Such a sorting criteria may comprise, for example, sorting the target aircraft 300 according to the range between a target aircraft 300 and the monitoring aircraft 200. Target aircraft priority is then assigned according to an importance ranking scheme which may at least be partially determined by, for example, the type, format, and/or quality of the data for a particular target aircraft 300. Note that, in this respect, one skilled in the art will understand and appreciate that many different sorting and ranking schemes may be implemented based on various characteristics of the data and within the spirit and scope of the present invention. Still further, the CSA/RM preprocessor 720 may also be configured to transmit appropriate data for multiple target aircraft 300 to the CSA processor 740 and/or the RM processor 760 as necessary, with preference for transmitting the data for the target aircraft 300 having the highest ranking for processing preference. In order to perform such functions as discussed, the CSA/RM preprocessor 720 may minimally require certain information from the ADS-B system 400 of both the monitoring aircraft 200 and the target aircraft 300. Required information may include, for example, the ICAO addresses of the target aircraft 200, the three-dimensional position of both the monitoring aircraft 200 and the target aircraft 300, the three-dimensional velocity of both the monitoring aircraft 200 and the target aircraft 300, the associated validities of the positions and velocities of both the monitoring aircraft 200 and the target aircraft 300, and the corresponding TOAs thereof.

Once the necessary information has been received and processed by the CSA/RM pre-processor 720, the information is sent to the CSA processor 740 so as to implement the conflict detection function. According to embodiments of the present invention and as will become apparent upon further discussion herein, a practical implementation of the CSA processor 740 typically requires valid ADS-B information for both the monitoring aircraft 200 and the target aircraft 300 including, for example, the horizontal position, the pressure altitude, the horizontal velocity (true track angle and ground speed), the pressure altitude rate, the uncertainty data ($NUC_P$), and the air/ground state thereof. However, for the purpose of facilitating explanation, the methodology applied herein will be described according to a more basic approach as one example of applying the appropriate concepts.

According to one embodiment of the present invention, the current three-dimensional position and the velocity vector of both the monitoring aircraft 200 and the target aircraft 300 comprise necessary information for the implementation of the conflict detection function by the CSA processor 740. Note that the function hereby described may be accomplished in software, hardware, or a combination of software and hardware as will be understood and appreciated by one skilled in the art and that the method as described herein is merely an example of a method of accomplishing the desired functionality. Accordingly, such functions may be accomplished with a computer device having one or more processing portions for accomplishing the associated method according to embodiments of the present invention. Such a computer device may comprise, for example, an appropriate chip-scale processor, a desktop personal computer, a laptop personal computer, a server, a router, a mainframe computer or like devices or combinations thereof capable of implementing the functions described herein as understood and appreciated by one skilled in the art. Further, it will be appreciated that the method described herein in conjunction with the computer device for implementing the methodology, may be further accompanied by a corresponding computer software program product being cooperable therewith and having one or more executable portions for accomplishing, performing, or directing the specified functions and methods as will also be understood and appreciated by one skilled in the art.

In discussing the conflict detection function herein, the terms X, Y, and Z are used to denote position according to longitude, latitude, and altitude, respectively. Similarly, the terms E, N, and V are used to denote velocity in the east-west direction, the north-south direction, and the vertical direction, respectively. Accordingly, the following conflict detection functionality and methodology may be implemented by, for example, the CSA processor 740.

Generally, the three-dimensional position and the velocity vector for the monitoring aircraft 200 at the current time may be expressed as:

$$(X_0, Y_0, Z_0) \text{ and } (E_0, N_0, V_0).$$

However, the position of the monitoring aircraft 200 may be expressed more generally as a function of time T as:

$$(X_0+E_0{}^*T, Y_0+N_0{}^*T, Z_0+V_0{}^*T).$$

Similarly, the position of the target aircraft 300 may be expressed as:

$$(X_t+E_t{}^*T, Y_t+N_t{}^*T, Z_t+V_t{}^*T).$$

Figure 2:
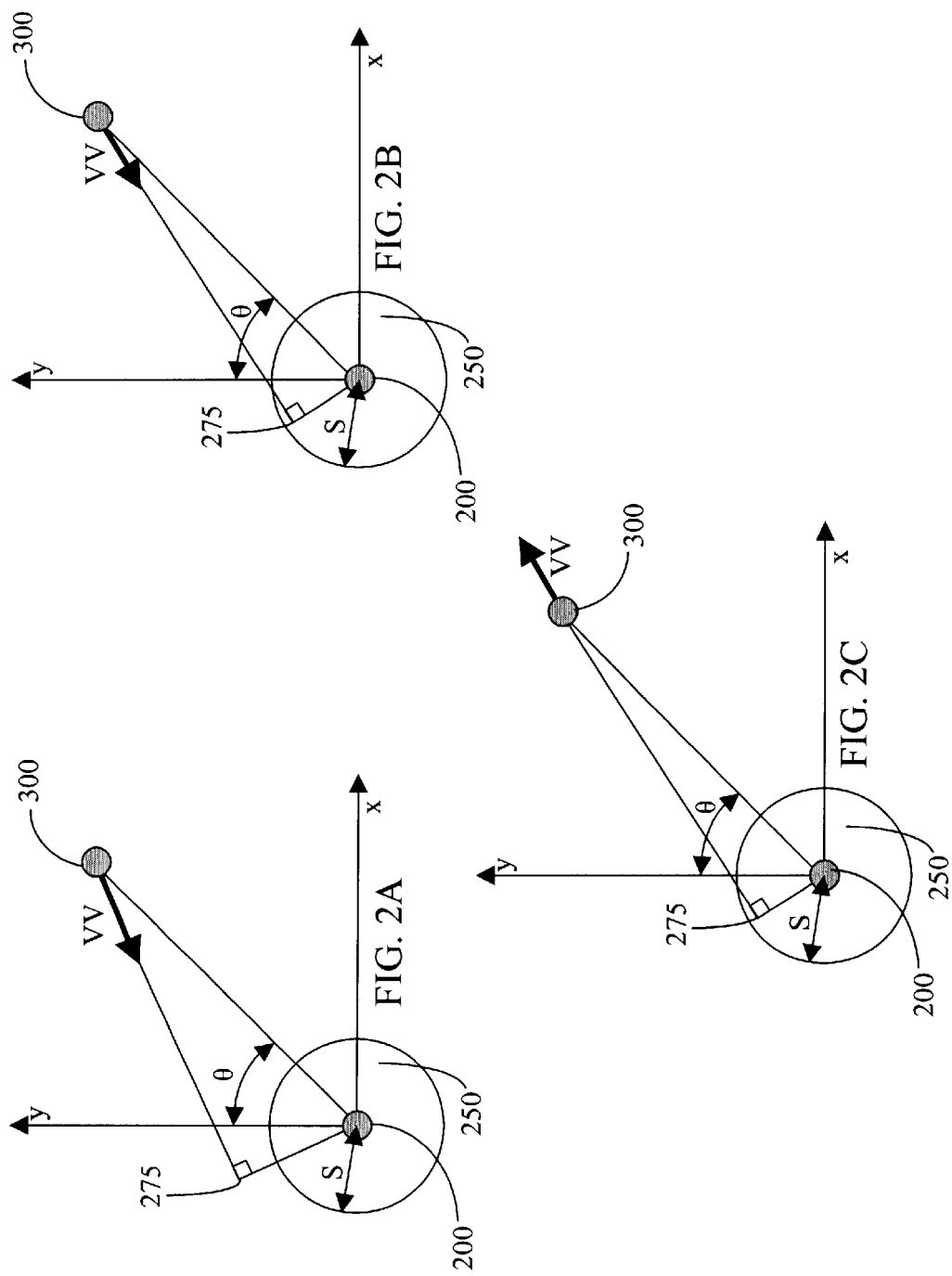
FIGS. 2A–2C are schematic representations of examples of conflict detection situations according to one embodiment of the present invention.

As further shown in FIGS. 2A–2C, it may sometimes be desirable to monitor for aircraft with conflicting flight paths over a distance range from the monitoring aircraft 200 by defining, for example, a Protected Airspace Zone ("PAZ") 250 about the monitoring aircraft 200. In some instances, the PAZ 250 may be defined as an upright cylinder having a defined radius S with the monitoring aircraft 200 as its center. The axis of such a cylinder would correspond to, for instance, a geocentric axis extending through the monitoring aircraft 200. Accordingly, between the monitoring aircraft 200 and the target aircraft 300, the conflict detection function may be configured to examine both a horizontal (x,y) and a vertical (z) separation between the two aircraft.

Generally, at any time T, the horizontal distance H between the monitoring aircraft and the target aircraft may be expressed as:

$$H^2=((X_0+E_0{}^*T)-(X_t+E_t{}^*T))^2+((Y_0+N_0{}^*T)-(Y_t+N_t{}^*T))^2 \tag{1}$$

If the following substitute terms are applied to Equation (1):

$$\Delta X = X_0 - X_t$$

$$\Delta Y = Y_0 - Y_t$$

$$\Delta E = E_0 - E_t$$

$$\Delta N = N_0 - N_t$$

Equation (1) can be restated as:

$$H^2=(\Delta X+\Delta E^*T)^2+(\Delta Y+\Delta N^*T)^2 \tag{2}$$

or $$H^2=T^{2*}(\Delta E^2+\Delta N^2)+2^*T^*(\Delta X^*\Delta E+\Delta Y^*\Delta N)+(\Delta X^2+\Delta Y^2) \tag{3}$$

According to this analysis, the desired horizontal separation S between the aircraft corresponds to, for example radius of the PAZ cylinder 250 defined about the monitoring aircraft 200. Thus, for a horizontal conflict (or "violation") to occur, the horizontal distance H between the aircraft must be equal to or less than the desired horizontal separation S. Therefore, a violation begins when H=S or $H^2-S^2=0$. It follows that a violation may be analyzed as a parabolic function expressed as:

$$T^{2*}(\Delta E^2+\Delta N^2)+2^*T^*(\Delta X^*\Delta E+\Delta Y^*\Delta N)+(\Delta X^2+\Delta Y^2)-S^2=0 \tag{4}$$

If the following substitute terms are applied to Equation (4):

$$A=\Delta E^2+\Delta N^2$$

$$B=(\Delta X^*\Delta E+\Delta Y^*\Delta N)^*2$$

$C=r^2-S^2$, where $r=(\Delta X^2+\Delta Y^2)^{1/2}$ (the initial range between the monitoring aircraft and the target aircraft), the horizontal violation function as shown in Equation (4) can be restated as:

$$AT^2+BT+C=0 \tag{5}$$

It follows from Equation (5) that a violation occurs if $B^2-4^*A^*C>0$. That is, a horizontal violation will occur in the period defined by $(-B\pm(B^2-4^*A^*C)^{1/2})/(2^*A)$. Thus, the beginning and end points of the horizontal violation period may be designated as h and h', respectively. Where, for example, the two aircraft are flying with the same horizontal velocity, A will be zero. In this instance, there is no solution for Equation (5), so h=0 and h'=∞, if $(\Delta X^2+\Delta Y^2)^{1/2}-S\leq 0$ holds true. That is, if the current horizontal distance H between the monitoring aircraft 200 and the target aircraft 300 is less than or equal to the desired horizontal separation S under those conditions, a horizontal violation (conflicting flight paths) will exist indefinitely. However, if the current horizontal distance H between the monitoring aircraft 200 and the target aircraft 300 is greater than the desired horizontal separation S, no horizontal violation will occur. In such an instance, h=h'=−∞ when $(\Delta X^2+\Delta Y^2)^{1/2}-S>0$.

FIGS. 2A–2C thus illustrate several example of different situations which may occur under the described reasoning, wherein the situations are illustrated with respect to a local coordinate system about the monitoring aircraft 200. More particularly, FIG. 2A illustrates a situation where $B^2-4AC<0$ and the closest point of approach ("CPA") 275 occurs outside the PAZ 250. In this situation, there is no conflict between the flight paths of the monitoring aircraft 200 and the target aircraft 300. FIG. 2B, however, illustrates a situation where $B^2-4AC>0$. In this instance, the CPA 275 is within the PAZ 250, thus indicating a conflict situation between the monitoring aircraft 200 and the target aircraft 300. FIG. 2C also illustrates a situation where $B^2-4AC>0$. However, in this instance, the velocity vector VV of the target aircraft 300 is directed generally away from the monitoring aircraft 200. Thus, this example illustrates that a conflict situation occurred between the monitoring aircraft 200 and the target aircraft 300 at a past time, but such a situation no longer exists at the present time. Where a conflict situation is determined, the CSA processor 740 forwards appropriate information to the alert module 780, wherein the situation may be more completely indicated in a variety of manners through the user interface 600 as will be understood and appreciated by one skilled in the art.

Further, a desired vertical separation v between the monitoring aircraft 200 and the target aircraft 300 can also be designated so as to produce another parabolic function for examining the conditions for a vertical violation where:

$$T^{2}*\Delta V^{2}+2*T*(\Delta Z*\Delta V)+\Delta Z^{2}-v^{2}=0 \qquad (6).$$

Following a similar analysis to the horizontal violation situation, the beginning and end points of the vertical violation period may be designated as v and v', respectively. Accordingly, where the two aircraft are flying with the same vertical velocity, there is no solution for Equation (6). In such an instance, v=0 and v'=∞, if $\Delta Z-v \leq 0$ holds. However, if $\Delta Z-v>0$, then v=v'=−∞.

When both the horizontal and vertical violation situations are considered, the predicted penetration of the PAZ cylinder 250 may occur if $v \leq h'$ and $h \leq v'$. If a penetration is predicted, the penetration period will begin and end at c and c', respectively, where:

c=MAX(h, v)

c'=MIN(h', v')

and MAX and MIN are functions that return the greatest and smallest values of the corresponding parameters, respectively. However, as shown, for example, in FIG. 2C, a predicted penetration of the PAZ cylinder 250 does not automatically imply a conflict situation between the two aircraft. This situation may occur where the predicted penetration occurs at a past time or at a future time beyond a time period designated the Specified Look-Ahead Time ("SLAT"). Accordingly, the CSA processor 740 may be configured to analyze the provided data for a violation over a predetermined time range indicated by the SLAT. Where the SLAT is defined as a duration of L seconds, conflicting flight paths between the aircraft will be indicated if:

(1) $v \leq h'$ and $h \leq v'$ (penetrating the protected cylinder), (2) $0<v'$ and $v \leq L$, or (3) $0 \leq h'$ and $h \leq L$, where conditions (2) and (3) can be merged into a single condition of $0 \leq c'$ and $c \leq L$.

Figure 3:
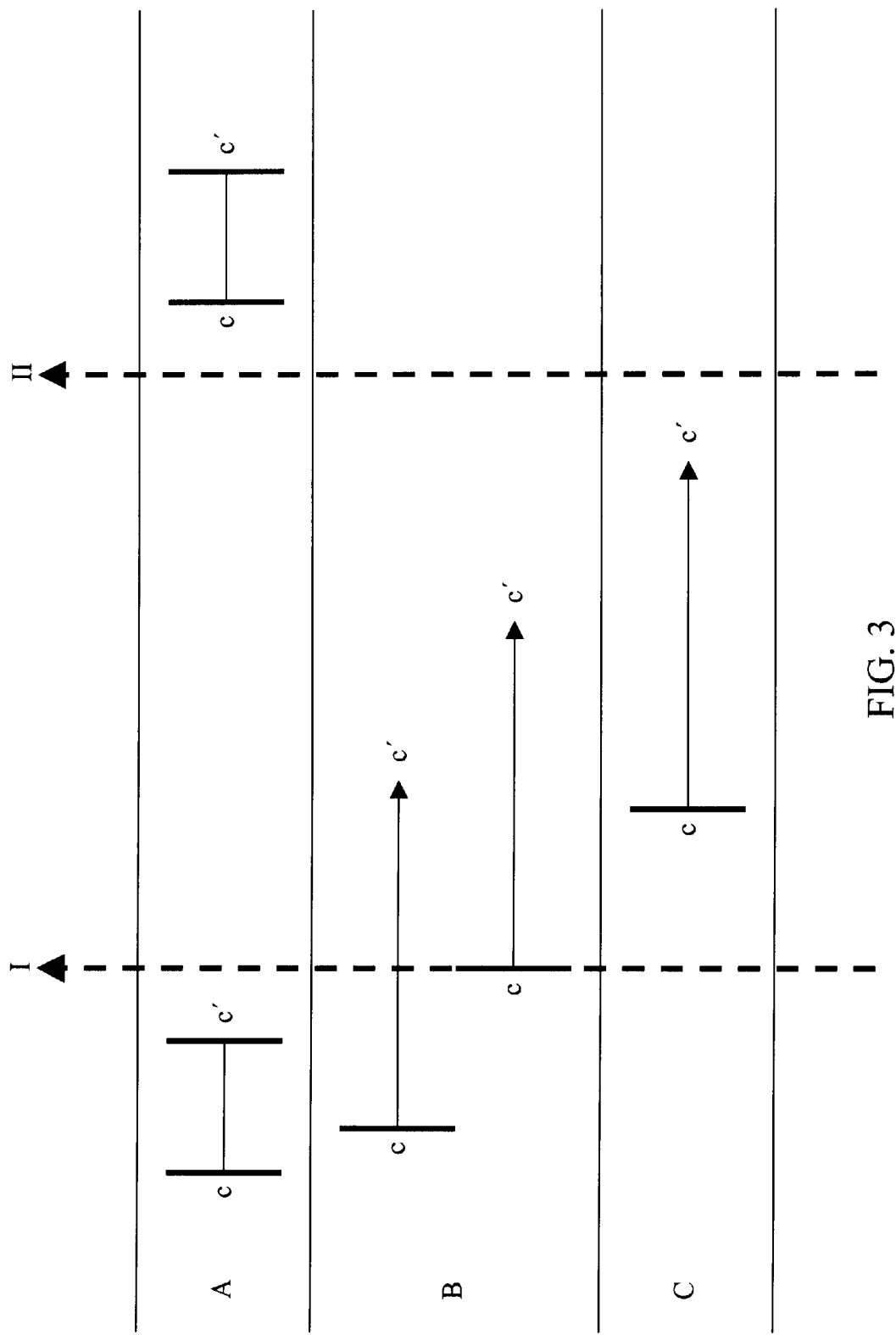
FIG. 3 is a schematic representation of the effect of the selected time on examples of conflict detection situations according to one embodiment of the present invention.

The SLAT concept is graphically illustrated by FIG. 3. Accordingly, no violation A is reported if the predicted penetration period of the PAZ 250 entirely occurs prior to the current time I or beyond the current time plus the SLAT II. In contrast, a violation is currently-existing B if the predicted penetration period begins on or before the current time I. Further, a violation is predicted C where the predicted penetration period begins after the current time I, but before the current time in addition to the SLAT II.

The previously described conflict detection function thus generally compares a desired separation S against the actual separation between the monitoring aircraft 200 and a target aircraft 300. If the difference between the desired separation S and the actual separation is less than or equal to zero, then a violation is declared (This difference may also be indicated as "∇" herein). The previously described methodology was predicated on the assumption that the reported positions and velocities of the monitoring aircraft 200 and the target aircraft 300 exactly correlated to the aircrafts' true positions and velocities. However, this situation is not necessarily the case in practical applications. Often, the navigational data supplied by the ADS-B system 400 and/or the GNSS device 500 of the respective aircraft includes uncertainty information associated with the geodetic coordinates or other information.

The practical effect of uncertainty information is that, in reality, the reported positions of both the monitoring aircraft 200 and the target aircraft 300 may vary by an error value from their respective true positions. Such an error value maybe reported as, for example, a $NUC_P$ value in ADS-B broadcast messages. To compensate for this error value, the separation distance between the monitoring aircraft 200 and the target aircraft 300 may be appropriately modified by an offset. Where U represents the higher limit, in nautical miles, of the HPL (Horizontal Protection Limit) corresponding to the reported $NUC_P$ value and H represents the actual separation between the monitoring aircraft 200 and the target aircraft 300, the worst case separation between the monitoring aircraft 200 and the target aircraft 300 occurs at H±U, where $U=U_0+U_t$. $U_0$ and $U_t$ further represent the horizontal uncertainty information for the monitoring aircraft 200 and the target aircraft 300, respectively. Accordingly, ∇=H±U−S. It thereby follows that a horizontal separation violation begins when ∇=0. However, since H, U, and S are all positive values, the earliest violation occurs when H−U−S=0. That is, the desired separation between the monitoring aircraft 200 and the target aircraft 300 is S+U, after the uncertainty information is taken into account, wherein the uncertainty-modified desired separation can further be appropriately applied to Equation (4), examined above.

The previously described methodology was developed based on a flat earth model which generally treats the earth as a flat surface. However, while the flat earth model may be an effective approximation that generates a very small amount of error for short ranges near the equator, the magnitude of error will increases significantly in the more extreme latitudes toward the earth's poles. Accordingly, the flat earth model is unable to provide an effective determination of a horizontal range near the poles due to the convergence of longitudinal lines at or about the poles. Thus, embodiments of the present invention advantageously employ the great circle earth model.

Figure 4:
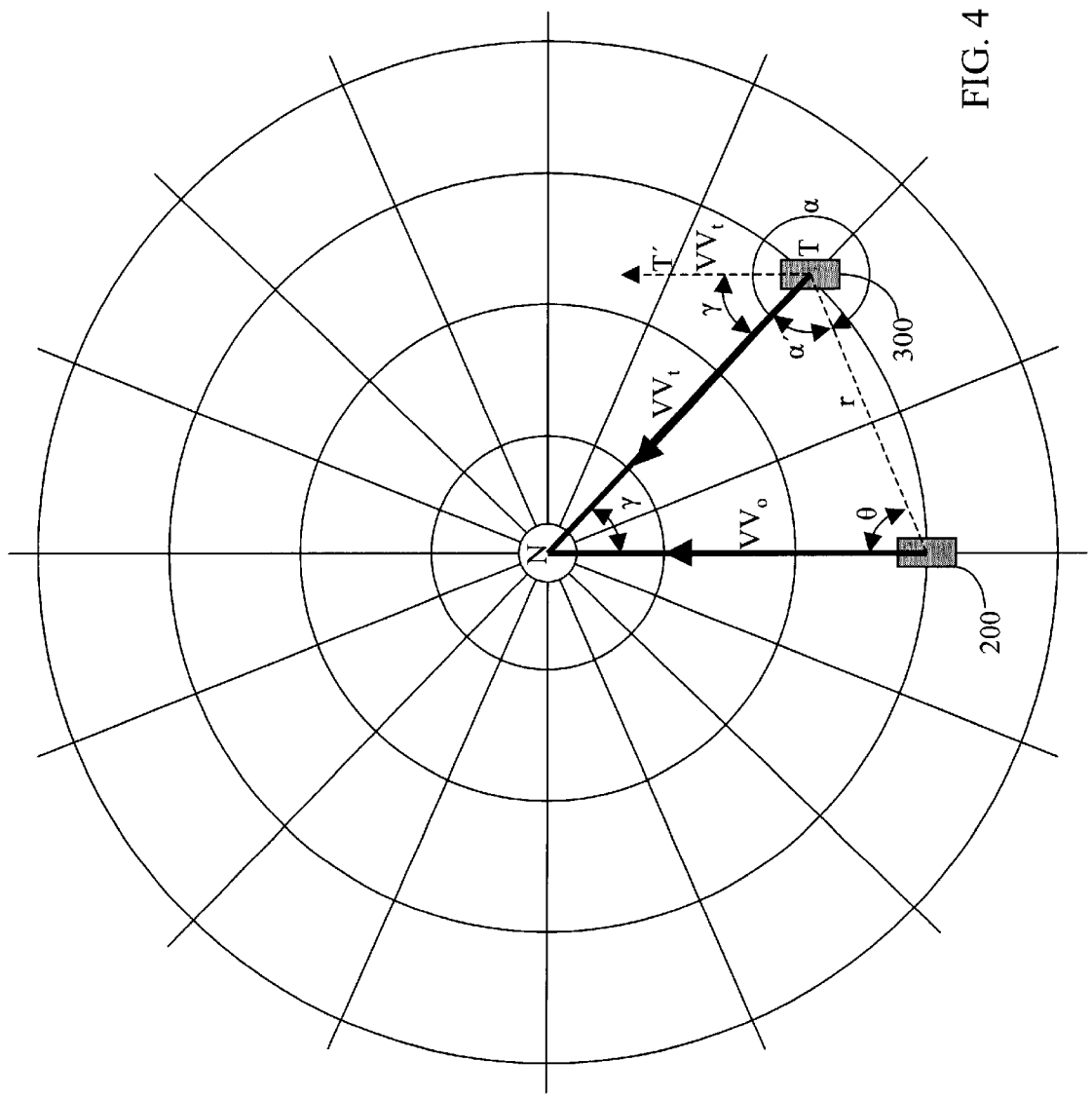
FIG. 4 is schematic representation of the position and the velocity vectors of the monitoring aircraft and the target aircraft, respectively, and the necessary modifications thereto using a great circle earth model according to one embodiment of the present invention.

According to this model and as shown in FIG. 4, the horizontal range r from the monitoring aircraft 200 to the target aircraft 300 can be expressed as:

$$r=R*\omega=R* \cos^{-1}(\sin Y_0 \sin Y_t + \cos Y_0 \cos Y_t \cos (X_0-X_t)),$$

where R is the radius of a sphere representing the earth and ω is the central angle subtended by the great circle arc between the monitoring aircraft 200 to the target aircraft 300. Terms ΔX and ΔY can thus be calculated as ΔX=r*cos θ and ΔY=r*sin θ, where θ is the bearing of the target aircraft 300 from the monitoring aircraft 200 as measured with respect to the true north N at the position of the monitoring aircraft 200. It follows that the terms ΔX and ΔY, as modified according to the great circle earth model, may subsequently be substituted in, for example, the violation function shown in Equation (4). Accordingly, the violation function is thereby also modified according to the great circle earth model so as to provide a more accurate determination of the position relationship between the aircraft.

Further, according to this model, when the two aircraft are close to the equator, the east-west and north-south directions from the perspective of the monitoring aircraft 200 will be almost parallel to the east-west and north-south directions, respectively, from the perspective of the target aircraft 300. However, these respective directions will not be parallel in the event that the two aircraft are moved to higher latitudes since the north-south directions of the two aircraft will converge at the pole. That is, if both aircraft fly toward true north N from the perspective of each, both aircraft will eventually reach the North Pole N. Therefore, neither the north-south component nor the east-west component of the relative velocity of the target aircraft 300 with respect to the monitoring aircraft 200 can be determined merely from the difference between the respective velocity vectors. Thus, embodiments of the present invention apply a local north at the position of the monitoring aircraft 200 as the reference direction. Accordingly, the velocity vector $VV_t$ of the target aircraft 300 is rotated by an angle $\gamma$ to compensate for the convergence of the meridians at higher latitudes. However, this correction may, in some instances, be significant even at moderate latitudes which are located at significant distances from the polar regions.

In determining the rotational angle $\gamma$, it is first noted that, according to a flat earth model, the true north of the target aircraft 300 (from T to T') would be parallel to the true north of the monitoring aircraft 200. However, since the earth may be characterized as an oblate spheroid according to the great circle earth model, the true north of the target aircraft 300 should converge with the true north of the monitoring aircraft 200 at the North Pole N. That is, the velocity vector $VV_t$ of the target aircraft 300 must be rotated with respect to true north of the monitoring aircraft 200, having its own velocity vector $VV_0$, even though, from the perspective of the target aircraft 300, the target aircraft 300 may appear to be traveling precisely true north. Accordingly, to determine the rotational angle $\gamma$, the bearing $\theta$ of the target aircraft 300 from the monitoring aircraft 200, measured with respect to the true north from the perspective of the monitoring aircraft 200, is determined. In addition, the bearing $\alpha$ of the monitoring aircraft 200 from the target aircraft 300, measured with respect to the true north from the perspective of the target aircraft 300, is determined, where $\alpha'=360-\alpha$. As such, the degree of rotation $\gamma$ may then be expressed as:

$$\gamma = 180 - \theta - \alpha' \quad (7)$$

It thereby follows that the horizontal velocity of the target aircraft 300, from the perspective of the monitoring aircraft 200, may be expressed as:

$$N_t' = E_t \sin\gamma + N_t \cos\gamma \quad (8)$$

$$E_t' = E_t \cos\gamma - N_t \sin\gamma \quad (9)$$

Thus, the terms $N_t'$ and $E_t'$ represent the horizontal velocity components of the target aircraft 300 as modified by the great circle earth model. Accordingly, these terms may be substituted for $N_t$ and $E_t$, respectively, in, for example, the violation function as shown in Equation (4). Therefore, in line with the great circle earth model, the modified position components ($\Delta X = r^* \cos\theta$ and $\Delta Y = r^* \sin\theta$) and the modified horizontal velocity components (as shown in Equations (8) and (9)), when substituted into, for example, the violation function as shown in equation (4), provide a more accurate representation of the flight paths of airborne vehicles and allow a more effective determination of conflict situations by accounting for the shape of the earth.

According to some embodiments of the present invention, the SLAT and/or the PAZ 250 are dynamically determined based upon either the radio altitude or the pressure altitude of the monitoring aircraft 200, as illustrated below, by example, in Table 1. For example, the SLAT and/or the PAZ 250 may be appropriately increased to account for air traffic within common cruising altitudes for such aircraft.

TABLE 1

| Monitoring Aircraft Altitude | Up to 1000 (radio) | 1000–2350 (radio) | 2350–5000 (pressure) | 5000–10,000 (pressure) | 10,000–20,000 (pressure) | 20,000–42,000 (pressure) | Above 42,000 (pressure) |
|---|---|---|---|---|---|---|---|
| Look-ahead Time (s) | 20 | 25 | 30 | 40 | 45 | 48 | 48 |
| Vertical Threshold for Alarm (ft.) | 850 | 850 | 850 | 850 | 850 | 850 | 1200 |
| Horizontal Threshold for Alarm (nmi) | 0.20 | 0.20 | 0.35 | 0.55 | 0.80 | 1.10 | 1.10 |

As implemented in embodiments of the present invention, the CSA processor 740 dynamically changes the PAZ 250 and the SLAT according to the altitude of the monitoring aircraft 200. However, if the information source (radio/pressure) supplying the altitude of the monitoring aircraft 200 happens to fail, the PAZ 250 and the SLAT are each set to a conservative value as indicated, for example, in the last column of Table 1. Generally, according to embodiments of the present invention, the conflict detection methodology as described herein is not applied against ground targets. In practical instances, at least the CSA/RM module 700 is deactivated when the monitoring aircraft 200 is on ground. Thus, for example, where a target is detected, but the airborne/ground state is unknown, the target is considered as airborne for the purposes of the CSA/RM module 700. Further, in some instances, altitude information from the radio altimeter of the monitoring aircraft 200 is preferred over information from the pressure altimeter. As a result, if the radio altimeter fails, the settings for the default sensitivity value are used. Further, if the radio altimeter is out of the service range, then the pressure altimeter is used to determine the appropriate sensitivity level.

According to further embodiments of the present invention, a range monitoring function may also be implemented in conjunction with or as an alternative to the conflict detection function. As shown in FIG. 1, the appropriate navigation information may also be transmitted from the CSA/RM pre-processor 720 to the RM processor 760 so as to provide the capability of monitoring the current horizontal distance between the monitoring aircraft 200 and a selected target aircraft 300, in instances where both aircraft have valid horizontal positions. Generally, the RM processor 760 requires the input of a desired horizontal separation distance, for example, through the range ring setting on the CDTI. In addition, according to embodiments of the present invention, a practical implementation of the RM processor 760 typically requires valid ADS-B information for both the monitoring aircraft 200 and the selected target aircraft 300 including, for example the horizontal position and the validity of that information. Accordingly, if the horizontal distance between the monitoring aircraft 200 and the selected target aircraft 300 is less then the desired separation distance, as determined by the RM processor 760, a range limit alert is forwarded to the alert module 780 and indicated through the user interface 600.

According to one embodiment of the present invention, where R is the desired range separation received, for example, from the user interface 600, and H is the current distance between the monitoring aircraft 200 and the selected target aircraft 300, a range limit alert is actuated if H'<R, where H' is a value corresponding to H rounded to the nearest tenth. For example, if a desired separation of 3 nautical miles is entered and the current separation between the monitoring aircraft 200 and the selected target aircraft 300 is 2.94 nautical mile, a range limit alert is actuated since H=2.94 nmi, R=3 nmi, and H'=2.9 nmi<R. However, in a similar manner, a range limit alert will not be actuated if H≧2.95 nmi since H' would be equal to 3.0 nmi. According to further embodiments of the present invention, the RM processor 760 may not be configured to implement horizontal uncertainty information to the range monitoring function due to its limited impact since the range monitoring function examines the current horizontal separation, rather than the projected separation, between the aircraft, and since the range monitoring function is typically applied to a selected target aircraft 300 in close proximity to the monitoring aircraft 200. However, according to the reasons previously examined, the great circle earth model is typically applied to the range monitoring function by the RM processor 760. In addition, since only the current horizontal separation between the monitoring aircraft 200 and the selected target aircraft 300 is monitored, the SLAT concept is typically inapplicable. Further, the range monitoring function is typically applicable in an air-to-air situation and therefore only applied to an airborne selected target aircraft 300 while the monitoring aircraft 200 itself is airborne.

Once the appropriate information has been processed by the CSA processor 740 and/or the RM processor 760 and a PAZ violation or range limit alert, respectively has been generated, the alert conditions are processed and analyzed by the alert module 780 so as to determine the appropriate indicia thereof, and whether it will be provided to the user interface 600. In some instances, since CSA conflicts ("CSA alert") and range limit alerts ("RM alert") are typically transient by nature, the alert module 780 may implement an alerting latency to minimize false alerts to the user interface 600. Accordingly, many different methodologies may be applied to examining the information received from the CSA processor 740 and/or the RM processor 760 as will be understood and appreciated by one skilled in the art. Further, the display, broadcast, or other dissemination of alert or other information, particularly configured for user-friendly presentation, by the user interface 600 from information provided thereto by the alert module 780 may be accomplished in numerous manners and varieties as will also be appreciated by one skilled in the art and will not be examined further herein.

According to some embodiments of the present invention, an RM alert is generated only with respect to a selected target aircraft 300 that has been, for example, already selected on the user interface 600 by the user of the CDTI. Thus, the alert module 780 typically does not provide a visual alert on the user interface 600 with respect to that selected target aircraft 300. However, when a CSA alert is declared against a target aircraft 300, a visual alert can be generated by, for example, changing the target icon type on CDTI. In addition, aural alerts may be provided through the user interface 600 for both CSA alerts and RM alerts.

Thus, embodiments of the present invention provide a method, system, and computer software program product for determining conflicting flight paths between aircraft or other airborne vehicles. Embodiments of the present invention are further capable of accounting for sources of inaccuracies, such as those present in navigational devices used by the airborne vehicles and in the modeling of the earth, so as to provide a collision avoidance system that is effective regardless of geodetic latitude and longitude and that is configured to account for inaccuracies in a transparent manner so as to facilitate user-friendliness of the collision avoidance system. Embodiments of the present invention therefore provide distinct advantages over other collision avoidance systems.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of determining conflicting flight paths between a first airborne vehicle and a second airborne vehicle, the vehicles being adapted to be airborne above the earth, the earth being shaped as an oblate spheroid having a curvature, said method comprising:

determining a position and a velocity vector for each of the first airborne vehicle and the second airborne vehicle;

defining a cylindrical volume about the first airborne vehicle, the first airborne vehicle being centrally disposed therein;

determining a separation distance between the first airborne vehicle and the second airborne vehicle at a selected time, the separation distance being at least partially determined from the position and the velocity vector of each vehicle and being adjusted with respect to the curvature of the earth using a great circle earth model;

determining an accuracy factor for the position of each vehicle;

modifying the separation distance by the accuracy factor; and determining whether the modified separation distance is within the cylindrical volume about the first airborne vehicle during a time range so as to determine whether conflicting flight paths exist between the first airborne vehicle and the second airborne vehicle.

2. A method according to claim 1 wherein each vehicle comprises an Automatic Dependence Surveillance-Broadcast (ADS-B) system having a Global Navigation Satellite System (GNSS) device and determining a position and a velocity vector further comprises determining a position and a velocity vector for each vehicle with the respective GNSS device.

3. A method according to claim 2 wherein determining an accuracy factor further comprises determining an accuracy factor for the position of each vehicle with the respective ADS-B system.

4. A method according to claim 2 wherein determining an accuracy factor further comprises determining an accuracy factor for each vehicle with the respective ADS-B system, at least one of the ADS-B systems having a GPS device.

5. A method according to claim 2 wherein determining an accuracy factor further comprises determining a Navigation Uncertainty Category for Position ($NUC_P$) factor for each vehicle from the respective ADS-B system.

6. A method according to claim 2 wherein modifying the separation distance further comprises modifying the separation distance by a high limit of a Horizontal Protection Limit (HPL) factor corresponding to a Navigation Uncertainty Category for Position ($NUC_P$) factor for each vehicle from the respective ADS-B system.

7. A method according to claim 2 wherein directing an alarm to be issued further comprises directing an alarm to be issued with an alert characteristic determined according to a priority level corresponding to a priority condition in a list of priority conditions, the priority level being at least partially determined from the ADS-B system of each vehicle and the alarm comprising at least one of a visual alert and an aural alert.

8. A method according to claim 1 wherein defining a cylindrical volume about the first airborne vehicle further comprises defining a cylindrical volume about the first airborne vehicle with the cylindrical volume having a geocentric axis extending through the first airborne vehicle.

9. A method according to claim 1 further comprising directing an alarm to be issued if the modified separation distance is within the cylindrical volume so as to indicate conflicting flight paths between the first airborne vehicle and the second airborne vehicle.

10. A method according to claim 1 wherein determining the position and the velocity vector further comprises determining the position and the velocity vector for each vehicle with a Global Positioning System (GPS) device.

11. A method according to claim 1 further comprising determining a common time reference with respect to the first airborne vehicle and the second airborne vehicle.

12. A method according to claim 1 wherein determining a separation distance further comprises determining a separation distance between the first airborne vehicle and the second airborne vehicle as a function of time so as to define a flight path for each vehicle.

13. A method according to claim 1 wherein determining a separation distance further comprises determining a separation distance adjusted with respect to the curvature of the earth using a great circle earth model by correlating the position and the velocity vector of the first airborne vehicle to a polar reference and then modifying the position and the velocity vector of the second airborne vehicle by an angular separation between the vehicles with respect to the polar reference.

14. A method according to claim 1 further comprising determining whether the modified separation distance was within the cylindrical volume about the first airborne vehicle at a time preceding the time range.

15. A method according to claim 1 further comprising determining whether the modified separation distance will be within the cylindrical volume about the first airborne vehicle at a time beyond the time range.

16. A method according to claim 1 further comprising adjusting the cylindrical volume and the time range according to an altitude of the first airborne vehicle.

17. A method according to claim 1 wherein defining a cylindrical volume further comprises defining a cylindrical volume about the first airborne vehicle corresponding to a desired separation distance between the first airborne vehicle and the second airborne vehicle.

18. A method according to claim 1 further comprising monitoring the separation distance between the first airborne vehicle and the second airborne vehicle, if the modified separation distance is within the cylindrical volume, so as to determine a status of the conflicting flight paths between the first airborne vehicle and the second airborne vehicle.

19. A method according to claim 1 further comprising altering the flight path of the first airborne vehicle until the modified separation distance is outside of the cylindrical volume.

20. A system for determining conflicting flight paths between a first airborne vehicle and a second airborne vehicle, the vehicles being adapted to be airborne above the earth, the earth being shaped as an oblate spheroid having a curvature, said system comprising:

a computer device housed by the first airborne vehicle, the computer device comprising:
a processing portion for determining a position and a velocity vector for each of the first airborne vehicle and the second airborne vehicle;
a processing portion for defining a cylindrical volume about the first airborne vehicle, the first airborne vehicle being centrally disposed therein;
a processing portion for determining a separation distance between the first airborne vehicle and the second airborne vehicle at a selected time, the separation distance being at least partially determined from the position and the velocity vector of each vehicle and being adjusted with respect to the curvature of the earth using a great circle earth model;
a processing portion for determining an accuracy factor for the position of each vehicle,
a processing portion for modifying the separation distance by the accuracy factor; and
a processing portion for determining whether the modified separation distance is within the cylindrical volume about the first airborne vehicle during a time range so as to determine whether conflicting flight paths exist between the first airborne vehicle and the second airborne vehicle.

21. A system according to claim 20 further comprising an Automatic Dependence Surveillance-Broadcast (ADS-B) system housed by each vehicle, each ADS-B system being capable of communicating with the computer device.

22. A system according to claim 21 further comprising a Global Navigation Satellite System (GNSS) device in communication with each ADS-B system.

23. A system according to claim 22 wherein at least one GNSS device further comprises a Global Positioning System (GPS) device.

24. A system according to claim 22 wherein the processing portion for determining a position and a velocity vector is further capable of determining a position and a velocity vector with the respective GNSS device.

25. A system according to claim 21 wherein the ADS-B system housed by the first airborne vehicle further comprises a subsystem capable of receiving an ADS-B broadcast from the ADS-B system housed by the second airborne vehicle.

26. A system according to claim 21 wherein the processing portion for determining an accuracy factor is further capable of determining an accuracy factor with the respective ADS-B system.

27. A system according to claim 21 wherein the processing portion for determining an accuracy factor is further configured to determine a Navigational Uncertainty for Position ($NUC_P$) factor for each vehicle from the respective ADS-B system.

28. A system according to claim 21 wherein the processing portion for modifying the separation distance is further configured to modify the separation distance by a high limit of a Horizontal Protection Limit (HPL) factor corresponding to a Navigational Uncertainty for Position ($NUC_P$) factor for each vehicle from the respective ADS-B system.

29. A system to claim 20 wherein the processing portion for defining a cylindrical volume is further capable defining a cylindrical volume about the first airborne vehicle such that the cylindrical volume has a geocentric axis extending through the first airborne vehicle.

30. A system according to claim 20 wherein the computer device further comprises a processing portion for directing an alarm to be issued if the modified separation distance is within the cylindrical volume so as to indicate conflicting flight paths between the first airborne vehicle and the second airborne vehicle.

31. A system according to claim 30 wherein the processing portion for directing an alarm to be issued is further configured to direct an alarm to be issued with an alert characteristic determined according to a priority level corresponding to a priority condition in a list of priority conditions, the alarm comprising at least one of a visual alert and an aural alert.

32. A system according to claim 20 wherein the computer device further comprises a processing portion for determining a common time reference with respect to the first airborne vehicle and the second airborne vehicle.

33. A system according to claim 20 wherein the processing portion for determining a separation distance is further capable of determining a separation distance as the function of time so as to define a flight path for each vehicle.

34. A system according to claim 20 wherein the processing portion for determining a separation distance is further capable of determining a separation distance adjusted with respect to the curvature of the earth using a great circle earth model by correlating the position and the velocity vector of the first airborne vehicle to a polar reference and then modifying the position and the velocity vector of the second airborne vehicle by an angular separation between the vehicles with respect to the polar reference.

35. A system according to claim 20 wherein the computer device further comprises a processing portion for determining at least one of whether the modified separation distance was within the cylindrical volume about the first airborne vehicle at a time preceding the time range and whether the modified separation distance will be within the cylindrical volume about the first airborne vehicle at a time beyond the time range.

36. A system according to claim 20 wherein the computer device further comprises a processing portion for adjusting the cylindrical volume and the time range according to an altitude of the first airborne vehicle.

37. A system according to claim 20 wherein the processing portion for defining a cylindrical volume is further configured to define a cylindrical volume about the first airborne vehicle corresponding to a desired separation distance between the first airborne vehicle and the second airborne vehicle.

38. A system according to claim 20 wherein the computer device further comprises a processing portion for monitoring the separation distance between the first airborne vehicle and the second airborne vehicle, if the modified separation distance is within the cylindrical volume, so as to determine a status of the conflicting flight paths between the first airborne vehicle and the second airborne vehicle.

39. A system according to claim 20 wherein the computer device further comprises a processing portion for directing the altering of the flight path of the first airborne vehicle until the modified separation distance is outside of the cylindrical volume.

40. A computer software program product capable of being executed by a computer device so as to determine conflicting flight paths between a first airborne vehicle and a second airborne vehicle, the vehicles being adapted to be airborne above the earth, the earth being shaped as an oblate spheroid having a curvature, the computer software program product comprising:

an executable portion capable of determining a position and a velocity vector for each of the first airborne vehicle and the second airborne vehicle;

an executable portion capable of defining a cylindrical volume about the first airborne vehicle such that the first airborne vehicle is centrally disposed therein;

an executable portion capable of determining a separation distance between the first airborne vehicle and the second airborne vehicle at a selected time, the separation distance being at least partially determined from the position and the velocity vector of each vehicle and being adjusted with respect to the curvature of the earth using a great circle earth model;

an executable portion capable of determining an accuracy factor for the position of each vehicle;

an executable portion capable of modifying the separation distance by the accuracy factor; and an executable portion capable of determining whether the modified separation distance is within the cylindrical volume about the first airborne vehicle during a time range so as to determine whether conflicting flight paths exist between the first airborne vehicle and the second airborne vehicle.

41. A computer software program product according to claim 40 wherein each vehicle comprises an Automatic Dependence Surveillance-Broadcast (ADS-B) system with a Global Navigation Satellite System (GNSS) device in communication therewith and the computer software program product further comprises an executable portion capable of directing communication between the computer device and the ADS-B system of each vehicle.

42. A computer software program product according to claim 41 wherein the executable portion capable of determining a position and a velocity vector is further capable of processing information from the respective GNSS devices so as to determine the position and the velocity vector of the corresponding vehicle.

43. A computer software program product according to claim 41 wherein the executable portion capable of determining an accuracy factor is further capable of processing information from the respective ADS-B systems so as to determine the accuracy factor of the corresponding vehicle.

44. A computer software program product according to claim 41 wherein the executable portion capable of determining a position and a velocity vector is further capable of determining a position and a velocity vector from at least one GNSS device comprising a Global Positioning System (GPS) device.

45. A computer software program product according to claim 41 wherein the executable portion capable of determining an accuracy factor is further capable of processing ADS-B broadcast information received by the ADS-B system housed by the first airborne vehicle to determine the accuracy factor.

46. A computer software program product according to claim 41 wherein the executable portion capable of determining an accuracy factor is further capable of determining a Navigational Uncertainty for Position ($NUC_P$) factor for each vehicle from the respective ADS-B system.

47. A computer software program product according to claim 41 wherein the executable portion capable of modifying the separation distance is further capable of modifying the separation distance by a high limit of a Horizontal Protection Limit (HPL) factor corresponding to a Navigational Uncertainty for Position ($NUC_P$) factor for each vehicle from the respective ADS-B system.

48. A computer software program product according to claim 40 wherein the executable portion capable of defining a cylindrical volume is further capable of defining a cylindrical volume having a geocentric axis extending through the first airborne vehicle.

49. A computer software program product according to claim 40 further comprising an executable portion capable of directing an alarm to be issued if the modified separation distance is within the cylindrical volume so as to indicate conflicting flight paths between the first airborne vehicle and the second airborne vehicle.

50. A computer software program product according to claim 49 wherein the executable portion capable of directing an alarm to be issued is further capable of directing an alarm to be issued with an alert characteristic determined according to a priority level corresponding to a priority condition in a list of priority conditions, the alarm comprising at least one of a visual alert and an aural alert.

51. A computer software program product according to claim 40 further comprising an executable portion capable of determining a common time reference with respect to the first airborne vehicle and the second airborne vehicle.

52. A computer software program product according to claim 40 wherein the executable portion capable of determining a separation distance is further capable of determining a separation distance as a function of time so as to define a flight path for each vehicle.

53. A computer software program product according to claim 40 wherein the executable portion capable of determining a separation distance is further capable of determining a separation distance adjusted with respect to the curvature of the earth using a great circle earth model by correlating the position and the velocity vector of the first airborne vehicle to a polar reference and then modifying the position and the velocity vector of the second airborne vehicle by an angular separation between the vehicles with respect to the polar reference.

54. A computer software program product according to claim 40 further comprising an executable portion capable of determining at least one of whether the modified separation distance was within the cylindrical volume about the first airborne vehicle at a time preceding the time range and whether the modified separation distance will be within the cylindrical volume about the first airborne vehicle at a time beyond the time range.

55. A computer software program product according to claim 40 further comprising an executable portion capable of adjusting the cylindrical volume and the time range according to an altitude of the first airborne vehicle.

56. A computer software program product according to claim 40 wherein the executable portion capable of defining a cylindrical volume is further capable of defining a cylindrical volume about the first airborne vehicle corresponding to a desired separation distance between the first airborne vehicle and the second airborne vehicle.

57. A computer software program product according to claim 40 further comprising an executable portion capable of monitoring the separation distance between the first airborne vehicle and the second airborne vehicle, if the modified separation distance is within the cylindrical volume, so as to determine a status of the conflicting flight paths between the first airborne vehicle and the second airborne vehicle.

58. A computer software program product according to claim 40 further comprising an executable portion capable of directing the altering of the flight path of the first airborne vehicle until the modified separation distance is outside of the cylindrical volume.

* * * * *

UNITED STATES PATENT AND TRADEMARK OFFICE
CERTIFICATE OF CORRECTION

PATENT NO.     : 6,564,149 B2
DATED          : May 13, 2003
INVENTOR(S)    : Lai

It is certified that error appears in the above-identified patent and that said Letters Patent is hereby corrected as shown below:

Column 17,
Line 10, after "system" insert -- according --;
Line 11, after "capable" insert -- of --.

Signed and Sealed this

Twenty-second Day of July, 2003

JAMES E. ROGAN
*Director of the United States Patent and Trademark Office*